Aug. 7, 1934.   J. H. FLINK   1,969,066
HOLDER
Filed Aug. 23, 1933
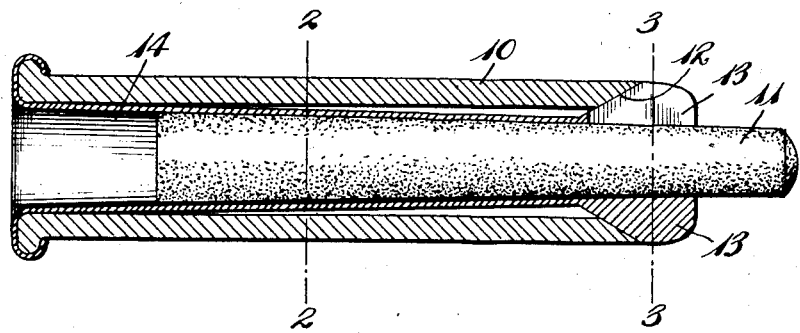
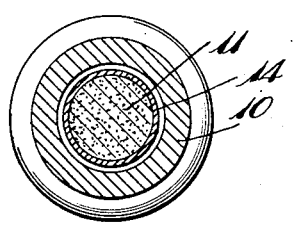 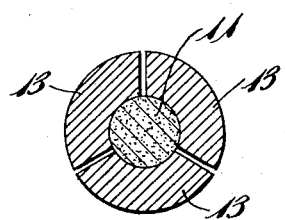
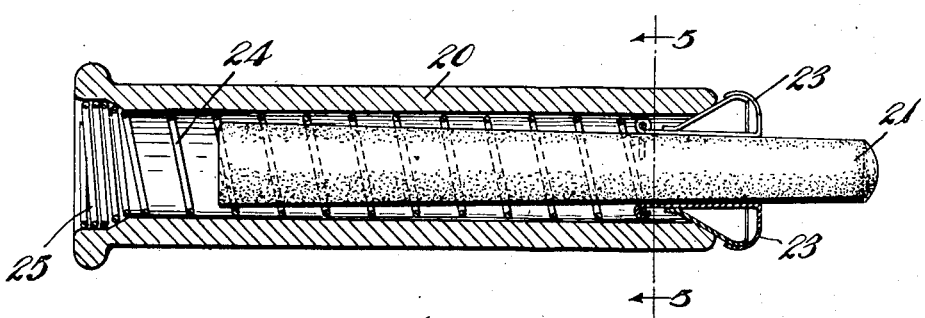
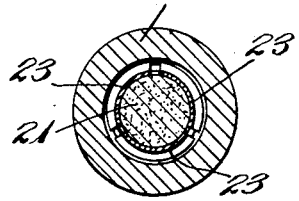

Patented Aug. 7, 1934

1,969,066

UNITED STATES PATENT OFFICE 1,969,066

HOLDER

John H. Flink, Watertown, Mass., assignor to Hood Rubber Company, Inc., Watertown, Mass., a corporation of Delaware Application August 23, 1933, Serial No. 686,375

5 Claims. (Cl. 120—13)

This invention relates to holders, especially holders for marking elements, such as chalk, crayon, charcoal, lipstick, etc.

The chief objects of the invention are to provide an improved holder in which the element to be held may be easily inserted and yet firmly held in place, and to provide a holder that is simple in construction and convenient to manufacture.

These and further objects will be apparent from the following description, in which:

Fig. 1 is a longitudinal section of a holder constructed according to and embodying the invention in its preferred form, a piece of chalk being positioned in the holder.

Fig. 2 is a section along the line 2—2 of Fig. 1.

Fig. 3 is a section along the line 3—3 of Fig. 1.

Fig. 4 is a view similar to Fig. 1 but showing a modified construction.

Fig. 5 is a section along the line 5—5 of Fig. 4.

Referring to the embodiment of Fig. 1, the holder comprises a tubular body 10 which may be of wood, metal, hard rubber, or any other suitable material, the bore being large enough to permit passage therethrough of a piece of chalk 11 or other element to be held. At its forward end the body 10 is formed with an annular beveled face 12 against which a plurality of jaw members 13, 13, having cooperating beveled surfaces, are adapted to be seated, the jaws together defining a central chalk accommodating aperture and the arrangement being such that when the jaws are urged rearwardly with relation to the tube, they are wedged into clamping engagement with the chalk to hold the latter in place.

For thus urging the jaws in the rearward direction a resilient element 14, preferably of rubber in tubular form, is mounted in the bore of the body 10 and is held in a stretched condition with its forward end secured to the jaws and its rear end secured to the body 10, as by being folded over the rear end of the latter, as shown, and cemented in place.

If desired, the jaws 13, 13 may be formed of rubber and may be made integral with the rubber tube 14, the rubber being advantageous for the jaws as well as the tube to give a slight cushioning action which some persons may prefer in a writing implement of this type. Also, the rubber gives a good frictional grip without injuring the chalk. The tube is preferably formed to converge somewhat in the forward direction so as to conform approximately to the shape of the chalk and embrace the same snugly over an extensive portion of its length, thereby contributing to its steady support in the holder.

The chalk or other element may be inserted into the holder from the rear and pressed forward until the desired amount projects at the front, and it may be thus advanced as it is worn. Upon release of the advancing pressure, the jaws are wedged into clamping relation with the chalk by the pull of the stretched tube 14 and the camming action of the beveled seat 12.

In the modification of Fig. 4 the holder body 20 is generally the same as that of Fig. 1, but the jaws 23, 23 are of bent sheet metal, and the tension element urging the jaws rearward is a spring 24 which is secured to the jaw members at its forward end as by a crimped-over relation of the sheet metal of the jaws, and is held in place at its rear end as by an enlargement 25 of the spring seating behind a shouldered portion in the bore of the body. The action is the same as for the embodiment of Fig. 1 except that the chalk does not have the benefit of the special advantages of the rubber of the first form.

Variations made be made without departing from the scope of the invention as it is hereinafter claimed.

I claim:

1. A holder comprising a body having an article accommodating opening, at least one jaw member movable into clamping relation with an article positioned in the opening, and resilient means disposed alongside such article and urging the jaw into the clamping position.

2. A holder as defined in claim 1 in which the said resilient means comprises a rubber tube enclosing the article and held stretched in the direction of its length.

3. A holder comprising a tubular body adapted to accommodate an article positioned within it and projecting from its front end, a plurality of jaw elements seated in the front end of the tube and having surfaces thereof cooperable with surfaces of the body to urge the jaws into article-clamping positions upon rearward movement of them relative to the body, and resilient means disposed alongside the held article within the body thus urging the jaw elements rearwardly and into their clamping positions.

4. A holder as defined in claim 3 in which the said resilient means comprises a rubber tube enclosing the article and held in a longitudinally stretched condition between the jaw elements and the body.

5. A holder as defined in claim 3 in which the said resilient means comprises a coil spring enclosing the article and held in a longitudinally stretched condition between the jaw elements and the body.

JOHN H. FLINK.